United States Patent [19]
Olper et al.

[11] Patent Number: 5,879,830
[45] Date of Patent: Mar. 9, 1999

[54] PROCESS FOR REGENERATING SODIUM SULPHIDE FROM THE SODIUM SULPHATE WHICH FORMS IN TREATING LEAD PASTE FROM EXHAUSTED BATTERIES

[75] Inventors: Marco Olper, Monza; Massimo Maccagni, Sesto San Giovanni; Silvano Cossali, Ponte Nossa, all of Italy

[73] Assignee: Ecochem Aktiengesellschaft, Vaduz, Liechtenstein

[21] Appl. No.: 985,041

[22] Filed: Dec. 4, 1997

[30] Foreign Application Priority Data

Dec. 4, 1996 [IT] Italy ............................... MI96A002539

[51] Int. Cl.[6] ........................... C01G 21/00; H01M 10/54
[52] U.S. Cl. .............................. 429/49; 423/98; 423/155; 423/179; 423/514; 423/551; 423/555; 423/566.2
[58] Field of Search ............................ 423/98, 182, 184, 423/199, 551, 555, 566.2, 514, 155, 179; 205/704; 429/49

[56] References Cited

U.S. PATENT DOCUMENTS

| 1,492,488 | 4/1924 | Sutherst .................................. 423/514 |
| 4,229,271 | 10/1980 | Prengaman et al. ..................... 204/114 |
| 4,769,116 | 9/1988 | Olper et al. ............................... 204/114 |
| 5,173,277 | 12/1992 | Montgomery et al. ................... 423/92 |
| 5,211,818 | 5/1993 | Moure, Jr. et al. ...................... 204/114 |
| 5,248,342 | 9/1993 | Montgomery et al. ..................... 134/7 |
| 5,630,931 | 5/1997 | Manequini ............................... 205/600 |

FOREIGN PATENT DOCUMENTS

724306A1 7/1996 European Pat. Off. .
572908 6/1924 France .

Primary Examiner—Gary P. Straub
Assistant Examiner—Timothy C. Vanoy
Attorney, Agent, or Firm—Pillsbury Madison & Sutro LLP

[57] ABSTRACT

A process is disclosed for treating lead paste from exhausted batteries. Calcium sulfite and calcium thiosulfite are formed by the reaction:

$$3Ca(OH)_2 + 4S° \rightarrow 2CaS + CaS_2O_3 + 3H_2O \quad (1).$$

The CaS and $CaS_2O_3$ is reacted with sodium sulfate to effect the double exchange reaction:

$$2CaS + CaS_2O_3 + 3Na_2SO_4 \rightarrow 2Na_2S + Na_2S_2O_3 + 3CaSO_4 \quad (2).$$

The sodium sulfide and sodium thiosulfate is then reacted with the lead paste for converting the various lead paste components ($PbSO_4$, $PbO$ and $PbO_2$) into PbS with the concomitant production of sodium sulfate. The sodium sulfate can be recycled to reaction (2).

3 Claims, 1 Drawing Sheet

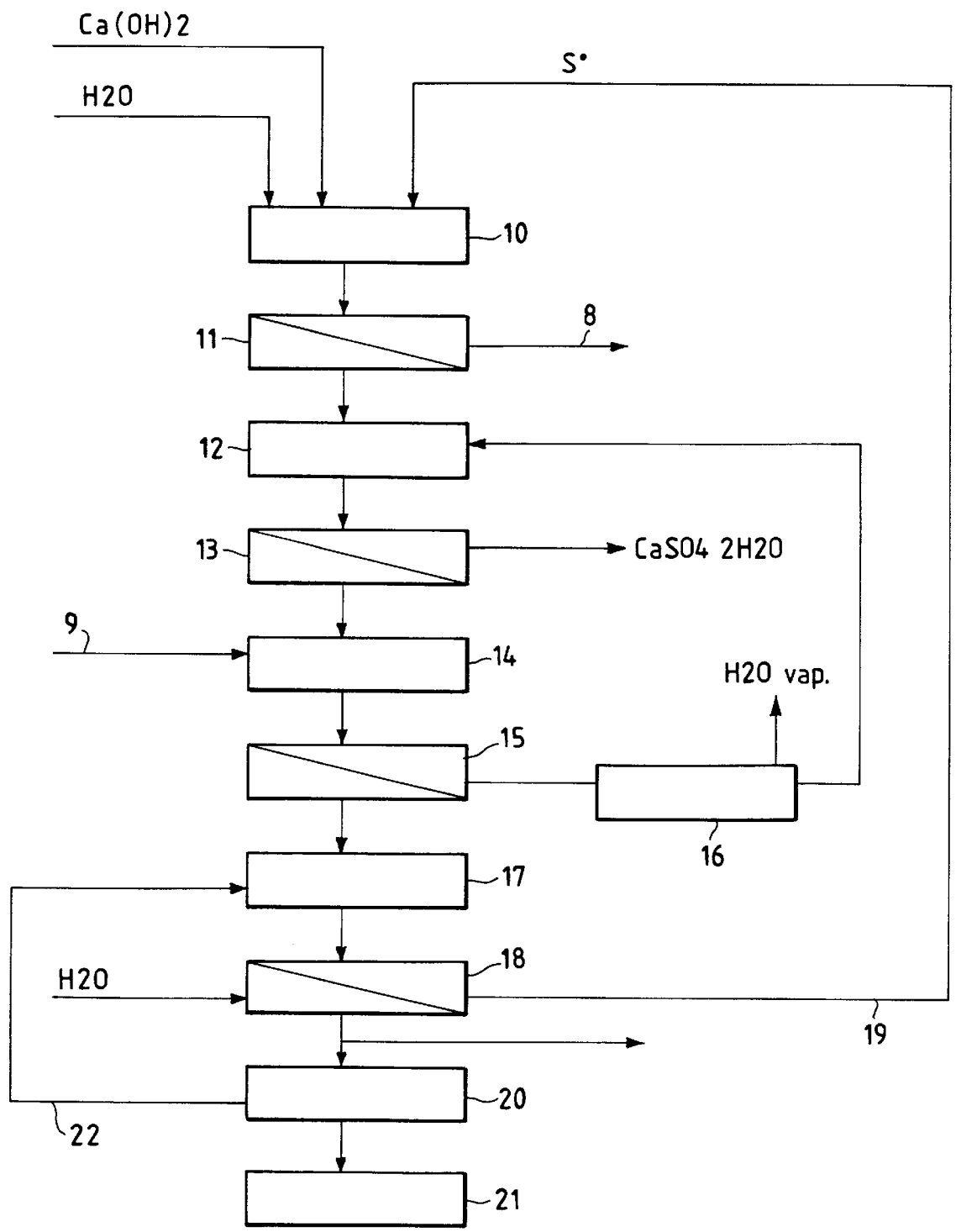

PROCESS FOR REGENERATING SODIUM SULPHIDE FROM THE SODIUM SULPHATE WHICH FORMS IN TREATING LEAD PASTE FROM EXHAUSTED BATTERIES

BACKGROUND OF THE INVENTION

Lead producers and experts of that field agree that to satisfy environmental protection requirements of applicable laws and regulations imposed by governmental authorities, Pb recovery from exhausted batteries must be achieved by a hydrometallurgical and electrolytic method. Notwithstanding this, industrial plants for electroextracting lead from solution have not yet been constructed. The reasons for this are various, but in particular are related to the operations required for modifying the paste to make it soluble in electrolytes.

In the numerous processes currently used for the thermal recovery of lead, the various desulphurizing agents (in particular $Na_2CO_3$, NaOH, $(NH_4)_2SO_4$) are effective in eliminating $SO_2$ from the reduction furnace off-gases, but this in itself does not solve the problems of environmental compatibility.

The disposability of by-products and the actual economy of the process are also factors. Finally, desulphurizing the paste does not completely solve the problem of applying electrochemical extraction, because not all the lead is converted into a soluble form and the lead extraction yield is incomplete. In the process of Manequini, U.S. Pat. No. 5,630,931 the past is reacted with a sodium sulphide solution. By converting all the components into PbS, the problem of completely dissolving the lead in the electrolyte is totally solved. However, this process still presents the problem of regenerating sodium sulphide from the sodium sulphate which forms in the process.

In this respect, this regeneration is effected by reduction with carbon in a furnace at 800°–900° C., requiring a complex plant for neutralizing the gaseous emissions generated. The financial investment is high, and can put the convenience of the entire process in doubt especially for small and medium producers.

SUMMARY OF THE INVENTION

The objects of the present invention are:
to provide a simple and ecologically safe method for regenerating sodium sulphide, which has been confirmed as an excellent sulphuration agent for all components of the paste, in that all the reactions take place in aqueous solution without any pollutant emissions having to be dealt with,
to minimize the influence of the reagents on the production cost, and
to minimize the problem of process by-products.

These objects are achieved according to the invention by a process for regenerating sodium sulphide from the sodium sulphate which forms in treating lead paste from exhausted batteries to form elemental sulphur, characterised by comprising the following steps:

a) reacting the elemental sulphur with an aqueous lime suspension in accordance with the reaction $$3Ca(OH)_2 + 4S° \rightarrow 2CaS + CaS_2O_3 + 3H_2O \quad (1)$$

to form calcium sulphide and calcium thiosulphate;

b) reacting the calcium salts formed in this manner with sodium sulphate in accordance with the reaction $$2CaS + CaS_2O_3 + 3Na_2SO_4 \rightarrow 2Na_2S + Na_2S_2O_3 + 3CaSO_4 \quad (2)$$

separating the formed calcium sulphate by filtration to obtain a solution containing sodium sulphide and thiosulphate which is suitable for treating the paste.

The process of the invention comprises the following reactions:

1) Sulphur disproportioning.

An aqueous lime suspension is heated to a temperature exceeding 90° C., crystalline sulphur is added and the temperature maintained for about 1 hour. The sulphur is converted into calcium sulphide and thiosulphate, both being soluble salts which pass into solution. Upon termination of the reaction, the solution is filtered to separate the lime impurities and the unreacted fractions.

2) Conversion of calcium salts into the corresponding sodium salts

Upon mixing the calcium sulphide and thiosulphate solution with a concentrated sodium sulphate solution, sodium sulphide and thiosulphate form, while the Ca precipitates as microcrystalline sulphate, which can be easily filtered off and represents a process by-product.

The lead paste, obtained by mechanical classification of exhausted batteries and suspended in water, is reacted with the filtered solution from the above described reaction 2), to obtain rapid and complete sulphuration of all the Pb contained. The product mixture is filtered.

The solution containing the sodium sulphate is evaporated until equilibrium is achieved in the cycle water balance, and is returned to the preceding stage for double exchange with the Ca salts. The lead sulphide, separated and carefully washed of sodium salts, passes to leaching with ferric fluoroborate, to form the rich electrolyte for electrowinning Pb and releasing elemental sulphur which returns to reaction 1) to react with a new measure of lime.

BRIEF DESCRIPTION OF THE DRAWINGS

For a better understanding of the characteristics and advantages of the invention, a non-limiting example of the complete process as heretofore substantially defined is described hereinafter with reference to the flow diagram on the accompanying drawing.

DETAILED DESCRIPTION

As shown on this drawing, a quantity of elemental S° in excess of the theoretical is added at 10 to a 5–10% $Ca(OH)_2$ slurry heated to a temperature >90° C., with the resultant reaction:

$$3Ca(OH)_2 + 4S° \rightarrow 2CaS + CaS_2O_3 + 3H_2O \quad (1)$$

The reaction is sufficiently rapid (it is completed within 1 hour) whether using blown crystalline sulphur or sulphur precipitated during the PbS leaching with the ferric fluoroborate electrolyte. The undissolved residue 8 (lime impurities, inert paste residues and other unreacted fractions) amounts to about 15 wt % of the feed and is separated by filtration in 11.

A 12% $Na_2SO_4$ solution close to boiling point is added in 12 to the filtrate of the preceding reaction. By maintaining the solution at temperature the double exchange reaction:

$$2CaS + CaS_2O_3 + 3Na_2SO_4 \rightarrow 2Na_2S + Na_2S_2O_3 + 3CaSO_4 \quad (2)$$

is complete in less than 30 min. Gypsum ($CaSO_4 \cdot 2H_2O$) precipitates in fine crystalline form, and is easily filtered off in 13. It should be noted that up to this point in the cycle no heavy metal salts have appeared, and hence the gypsum process by-product is white, and of technically pure quality.

The Pb paste 9, obtained by known mechanical classification of exhausted batteries and suspended in water, is reacted in 14 with the filtered sodium sulphide and thiosulphate solution. Not only the sodium sulphide but also the thiosulphate reacts with the heavy metal, to precipitate PbS and form $Na_2SO_4$.

It has been found experimentally that the reactions relative to the various paste components are as follows:

$$PbSO_4+Na_2S_2O_3+H_2O \rightarrow PbS+Na_2SO_4+2H+$$

$$PbO+Na_2S_2O_3 \rightarrow PbS+Na_2SO_4$$

$$4PbO_2+5Na_2S_2O_3+H_2O \rightarrow 4PbS+5Na_2SO_4+H_2SO_4$$

Hence, the only products are always PbS and $Na_2SO_4$, the solution pH tending to decrease at the end.

The presence of $Na_2S_2O_3$ in addition to $Na_2S$ improves the sulphuration reaction, so much so that PbS conversion yields of close to 100% have been observed. Consequently it can be stated that whereas desulphurization effected by known methods usually reaches PbO conversion yields of 90–95%, the process of the invention reaches much higher values.

The PbS filtration in 15 at the end of the reaction is rapid. The sodium sulphate solution is evaporated in 16 and recycled to stage 12. The filtered PbS is fed to 17 for leaching with ferric fluoroborates. The fluoroborate which form are filtered in 18 to separate the precipitated elemental sulphur, which is recycled through 19 to stage 10. Washing is effected with water to easily and totally remove sodium salts which could contaminate the fluoroboric electrolyte.

The fluoroborates in solution are fed to electrowinning from which electrolytic Pb is obtained in 21, the electrolyte being recycled through 22 to the leaching stage 17.

Some non-limiting quantitative examples of the process are given hereinafter.

EXAMPLE 1

8 g of $Ca(OH)_2$ are suspended in 100 ml $H_2O$ and heated to a temperature of >90° C., 16 g of crystalline S then being added and left to react for 50 minutes at a temperature of between 90° and 100° C.

The filtered solution contains:

| | |
|---|---|
| CaS | 24 g/l |
| $CaS_2O_3$ | 22 g/l |
| S° | 46 g/l (as calcium polysulphide) |

The filtration residue amounts to 3.27 g.

16 g of anhydrous $Na_2SO_4$ dissolved in 50 ml $H_2O$ and heated to boiling are added to the filtrate of the aforegoing analysis. It is left to react for 20 minutes.

The final filtered solution contains:

| | |
|---|---|
| $Na_2S$ | 14.9 g/l |
| $Na_2S_2O_3$ | 12.3 g/l |
| S° | 27.7 g/l (as sodium polysulphide) |

Calculated yields for Ca:

| | |
|---|---|
| on the Ca + S° analysis | 98% |
| on the $Na_2SO_4$ analysis | 96% |

Calculated yields for S°:

| | |
|---|---|
| on the Ca + S° analysis | 103% |
| on the $Na_2SO_4$ analysis | 100% |

Hence, starting from lime and sulphur a sulphide/thiosulphate ratio can be achieved which is excellent for paste sulphuration.

EXAMPLE 2

25 g of $Ca(OH)_2$ are suspended in 300 ml $H_2O$ and heated to 92° C., 50 g of elemental S precipitated from the PbS during its leaching with ferric fluoroborate solution then being added. After one hour of reaction at 92°–94° C. the solution was filtered.

The filtration residue amounts to 9.6 grams.

48 g of $Na_2SO_4$ dissolved in 80 ml of boiling water are added to the filtered solution.

Filtration is carried out after maintaining the temperature for ½ hour.

48 g of dry gypsum are obtained together with a sulphurating solution which, according to its $Na_2S$ and $Na_2S_2O_3$ analysis, is able to treat 100 g of paste. Sulphuration is carried out and at the end of the reaction 136 g of wet PbS are filtered off which, by leaching with ferric fluoroborate solution, pass 70.5 g of $Pb^{2+}$ into solution.

The residue from this leaching amounts to 34.2 g of dry matter comprising the released S° and the paste insolubles.

As is apparent from the aforegoing description and examples, the process of the invention effectively attains all the initially stated objects.

Moreover, given its purity and the absence of heavy metals, the gypsum produced can either be marketed or, if no local market exists, be dumped on a normal dump. The other intermediate products (elemental sulphur from the sulphide leaching and the sodium sulphate solution resulting from the paste sulphuration) are completely recycled.

The Italian priority application No. MI96A 002539 is herein incorporated by reference.

We claim:

1. A process for treating lead paste from exhausted batteries, comprising the steps of:

(a) reacting elemental sulfur with an aqueous lime suspension in accordance with the reaction:

$$3Ca(OH)_2+4S° \rightarrow 2CaS+CaS_2O_3+3H_2O \qquad (1)$$

to form calcium sulphide and calcium thiosulphate;

(b) reacting the calcium salts formed in step (a) with sodium sulphate in accordance with the reaction:

$$2CaS+CaS_2O_3+3Na_2SO_4 \rightarrow 2Na_2S+Na_2S_2O_3+3CaSO_4 \qquad (2)$$

(c) separating the calcium sulphate formed in step (b), by filtration, to obtain a solution containing sodium sulphide and thiosulphate which is suitable for treating said lead paste; and (d) suspending said lead paste in water, and reacting the sodium sulphide and thiosulphate solution obtained in step (b) with said lead paste suspended in water, to produce PbS and $Na_2SO_4$, in accordance with the reactions $$PbSO_4+Na_2S_2O_3+H_2O \rightarrow PbS+Na_2SO_4+2H_2SO_4 \qquad (3)$$

$$PbO+Na_2S_2O_3 \rightarrow PbS+Na_2SO_4 \qquad (4)$$

$$4PbO_2+5Na_2S_2O_3+H_2O \rightarrow 4PbS+5Na_2SO_4+H_2SO_4 \qquad (5).$$

2. The process as claimed in claim 1, further comprising: recycling said $Na_2SO_4$ produced in step (d) to step (b) for reaction with said calcium salts.

3. The process as claimed in claim 1, further comprising: leaching said PbS produced in step (d) with ferric fluoroborate to form elemental sulfur, and recycling this elemental sulfur to step (a).

* * * * *